(12) United States Patent  (10) Patent No.: US 7,984,735 B1
Hayes et al.  (45) Date of Patent: Jul. 26, 2011

(54) PORTABLE LOG CUTTER

(76) Inventors: Kim T. Hayes, Atlanta, MI (US); Paula J. Hayes, Atlanta, MI (US)

( * ) Notice: Subject to any disclaimer, the term of this patent is extended or adjusted under 35 U.S.C. 154(b) by 970 days.

(21) Appl. No.: 11/713,933

(22) Filed: Mar. 5, 2007

Related U.S. Application Data

(60) Provisional application No. 60/778,601, filed on Mar. 3, 2006.

(51) Int. Cl.
  *B27L 5/04* (2006.01)
(52) U.S. Cl. ........ 144/363; 144/376; 144/378; 83/471.2
(58) Field of Classification Search ............. 144/3, 192, 144/193, 242, 366; 83/471.2, 483, 490, 928
  See application file for complete search history.

(56) References Cited

U.S. PATENT DOCUMENTS

| | | | | | |
|---|---|---|---|---|---|
| 2,039,017 | A | * | 4/1936 | McLeod | 83/436.7 |
| 4,010,665 | A | * | 3/1977 | Kidd | 83/477.2 |
| 4,055,206 | A | * | 10/1977 | Griffin | 144/285 |
| 4,128,117 | A | * | 12/1978 | Terry et al. | 144/4.6 |
| 4,133,572 | A | * | 1/1979 | Robbins et al. | 296/168 |
| 4,164,965 | A | * | 8/1979 | Bodart | 144/4.6 |
| 4,219,057 | A | * | 8/1980 | Falk | 144/4.6 |
| 4,228,708 | A | * | 10/1980 | Martin | 83/404.1 |
| 4,258,764 | A | | 3/1981 | Gerst | |
| 4,259,886 | A | | 4/1981 | Seid et al. | |
| 4,269,242 | A | | 5/1981 | Smith | |
| 4,273,171 | A | | 6/1981 | Spaulding, Sr. | |
| 4,294,295 | A | * | 10/1981 | Olin | 144/4.6 |
| 4,331,052 | A | * | 5/1982 | Neff | 83/155 |
| 4,441,535 | A | * | 4/1984 | Flinn et al. | 144/4.6 |
| 4,478,263 | A | * | 10/1984 | Johnston | 144/4.6 |
| 4,531,440 | A | * | 7/1985 | Lucky | 83/471.2 |
| 4,722,258 | A | * | 2/1988 | Johnson | 83/72 |
| RE33,233 | E | * | 6/1990 | Freeman | 144/4.6 |
| 4,930,386 | A | * | 6/1990 | Laskowski et al. | 83/399 |
| 5,152,721 | A | * | 10/1992 | Sajczvk et al. | 474/135 |
| 5,282,501 | A | * | 2/1994 | Miller, III | 144/4.6 |
| 5,651,404 | A | | 7/1997 | Kraemer et al. | |
| D381,994 | S | | 8/1997 | Weirick | |
| 5,680,888 | A | * | 10/1997 | St-Pierre et al. | 144/357 |
| 5,784,941 | A | * | 7/1998 | Sanborn | 83/794 |
| 5,894,873 | A | | 4/1999 | Weeks | |
| 6,640,852 | B1 | | 11/2003 | Rogers | |
| 6,732,774 | B1 | | 5/2004 | Seckel | |

* cited by examiner

*Primary Examiner* — David J Walczak
*Assistant Examiner* — Jennifer Chiang
(74) *Attorney, Agent, or Firm* — Montgomery Patent and Design; Robert C. Montgomery

(57) ABSTRACT

A portable, vehicle-towed cut-off saw for firewood and the like is herein disclosed for cutting down regular length firewood into pieces that can be used in a stove or smaller fireplace. The invention is mounted on a steel frame with two wheels and a trailer tongue that allows it to be towed by a vehicle such as an automobile, truck or all-terrain vehicle (ATV). The invention is powered mechanically by an onboard four cylinder gasoline engine which provides power via a series of belts and pulleys. The pulleys drive a large diameter circular saw blade which pivots from the bottom of a large feed table. The invention will cut wood up to 12" in diameter with one pass. The saw blade is retractable, is protected by a guard, and is only exposed when cutting wood. The invention can be towed directly to the cutting or piling site and is easily moved and operated by one person. The use of the device allows for the cutting of firewood into smaller pieces using production cutting methods in a manner which is not only quick, easy and effective, but safer and less fatiguing as well.

10 Claims, 7 Drawing Sheets

PORTABLE LOG CUTTER

RELATED APPLICATIONS

The present invention was first described in U.S. Provisional Patent No. 60/778,601 filed on Mar. 3, 2006.

FIELD OF THE INVENTION

The present invention relates generally to a unique system and method for a portable, vehicle-towed cut-off saw for cutting firewood into sections that can be used in a wood stove or smaller fireplace and, more particularly, to a novel apparatus that is mounted upon a towable steel frame having a series of belts and pulleys designed for cutting logs that is powered mechanically by an on-board gasoline engine.

BACKGROUND OF THE INVENTION

Firewood from cut trees is used as fuel on a daily basis. Whether the fire is for heating, lighting, general ambience or the like in a home or at a campsite, wood remains a viable option for many due to its low cost and the fact that it is a renewable resource. One item that must be considered when using firewood in a stove or small fireplace, however, is that it must be cut to fit. While many people resort to using a handsaw to cut the wood down, it is a tedious and strenuous process. Some people resort to using a chainsaw, but this results in wasted wood due to the large curve cut of the chainsaw. Additionally, the wood must be held while cutting it down, which is not only a huge safety consideration, but also can result in back stress and strain should it be placed on the ground.

Solving the problem as described above, the unique apparatus is a portable, vehicle-towed cut-off saw for firewood. It is used to cut down regular length firewood into pieces that can be used in a stove or smaller fireplace. The invention is mounted on a steel frame with two wheels and a trailer tongue that allows it to be towed by a vehicle such as an automobile, truck or all-terrain vehicle (ATV). The invention is powered mechanically by an on board four cylinder gasoline engine which provides power via a series of belts and pulleys. The pulleys drive a large 30" diameter circular saw blade which pivots from the bottom of a large feed table. The invention will cut wood up to 12" in diameter with one pass. The saw blade is protected by a retractable guard and is only exposed when cutting the wood. The invention can be towed directly to the cutting or piling site and is easily moved and operated by one person. The use of the innovative method and apparatus allows for the cutting of firewood into smaller pieces using production cutting methods in a manner which is not only quick, easy and effective, but safer and less fatiguing as well.

Several attempts have been made in the past to provide an apparatus that effectively cuts cord wood into a more manageable size for firewood in a portable trailer or vehicle, thereby assisting the user in providing such a cutter directly at the location of the cord wood to be cut. U.S. Pat. No. 4,259,886 in the name of Seid et al., discloses a wood cutter and loader for cutting tree length material or logs into pulpwood, saw logs, and the like. The wood cutter and loader includes framework supporting a plurality of conveying and feeding chains, and a spring-loaded latch assembly associated with the saws. Unfortunately, the Seid et al. device utilizes a conveying mechanism whereas the present invention utilizes a manual feed system and a manually-operated saw frame pivot assembly associated with the saw blade.

U.S. Pat. No. 4,219,057, in the name of Falk, teaches a tree processing machine that delimbs the tree, feeds the delimbed tree through a machine that cuts the tree into logs of burning size, stacks the cut wood, and bales the stacks. The Falk device is an all-inclusive device that combines many technologies of wood processing whereas the present invention merely handles the cutting of logs into more manageable sizes on a portable trailer.

Additional patents have been issued dealing with the cutting and splitting of logs or felled trees, namely U.S. Pat. No. 5,894,873, issued in the name of Weeks; U.S. Pat. No. 4,273,171, issued in the name of Spaulding, Sr.; U.S. Pat. No. 4,269,242, issued in the name of Smith et al.; U.S. Pat. No. 6,640,852, issued in the name of Rogers; U.S. Pat. No. 5,651,404, issued in the name of Kraemer et al.; and, U.S. Pat. No. 6,732,774, issued in the name of Seckel.

None of the prior art particularly describes a portable trailer-mounted wood cutting apparatus driven by a motor and a belt-and-pulley system. Accordingly, there is a need for a means by which firewood can be quickly and easily cut down in size for use in stoves and small fireplaces without the disadvantages as listed above.

SUMMARY OF THE INVENTION

In view of the foregoing disadvantages inherent in the prior art, it has been observed that there is need for a log cutter that is easily transportable to a site where cord wood is located.

Also, it has been observed that there is a need for such a device to be operated by a motorized drive system, wherein said drive system transfers power to a belt and pulley system which drives a cutting blade.

In lieu of the observations mentioned above, it is an object of the present invention to provide such a portable log cutter that is mounted thereto a frame assembly, comprising a trailer frame further comprising a dual wheel assembly.

Another object of the present invention provides for said frame assembly to further comprise said trailer frame with a motor mounting means for a motor at a rear end, a protective motor frame protecting said motor, a towing assembly mounted thereto a front end, an upper frame mounted vertically from said trailer frame, and a lower guard panel assembly mounted thereto said upper frame and said trailer frame, wherein said frame assembly provides a secure guarding means, a structural means, a transporting means for said portable log cutter.

Another object of the present invention provides for said frame assembly to further comprise a generally rectangular shape and manufactured out of a heavy-duty and resilient material to support the weight of the portable log cutter assembly.

A further object of the present invention is to provide a feed table and feed fence assembly for guiding an uncut length of wood thereto said cutting mechanism, a first upper guard panel for protecting said operator when said portable log cutter is operating, a second upper guard panel for holding said circular saw blade when in a resting position, and a saw blade guard having a narrow opening for allowing a leading edge of said circular saw blade to be exposed when in a cutting position.

Yet another object of the present invention is to provide a cutting mechanism, further comprising a pair of pivot arms pivotally mounted at a lower end in a vertical orientation thereto a pivot shaft supported thereon said trailer frame; a pair of return springs, thereby provide a tension force to said pivot arms; a saw shaft frame orthogonally mounted thereon an upper end of said pair of pivot arms, said saw shaft frame having a handle end and a cutting end; a handle mounted to said handle end of said saw shaft frame, said handle manually pivots said cutting mechanism therebetween said resting position and said cutting position by said operator; a saw pulley mounted thereto said handle end of said saw shaft frame; a saw shaft, mounted thereto said saw shaft frame via bracketry and having a pulley end and a saw shaft cutting end; a circular saw blade mounted to said saw shaft cutting end via a second flange coupling; and, a stop member, mounted thereto said upper frame in a horizontal position, thereby providing a hard stop position for said saw shaft frame when said cutting mechanism is moved to said resting position.

Yet another object of the present invention is to provide is to provide a drive system comprising a prime mover and a secondary mover system; wherein said prime mover receives power from said control system and transfers power to said secondary system, said secondary system operates said circular saw frame.

Still another object of the present invention provides for said prime mover comprising a 4 cylinder gasoline-powered motor and said secondary mover to be a drive and pulley system comprising a drive pulley mounted to a drive shaft and driving a pair of belts, a pivot pulley, a saw pulley, and an idler pulley.

Still another object of the present invention provides for said control system to be a 12V battery and electric starter/generator unit operated by an ignition key switch.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
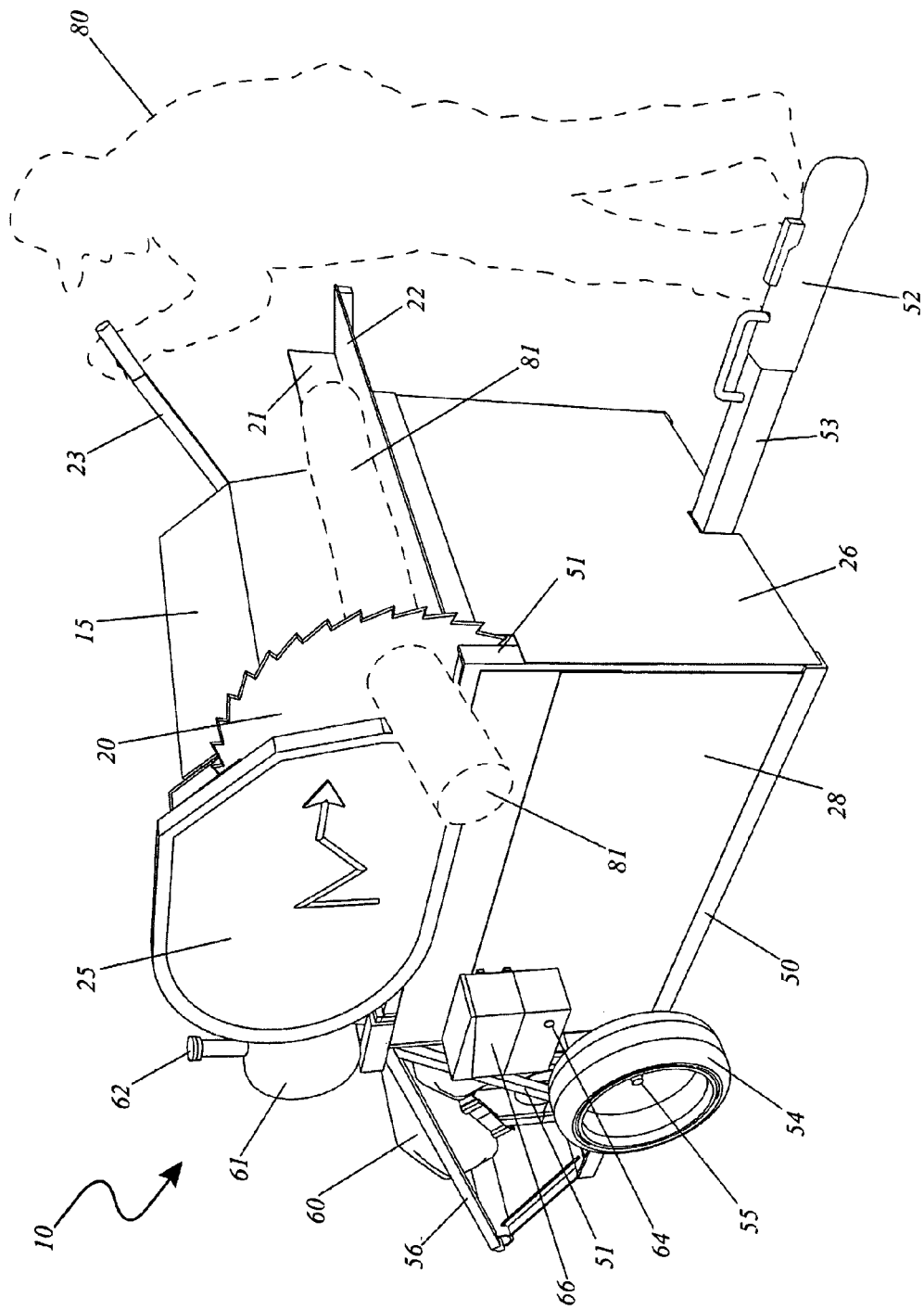
FIG. 1 is an environmental view of a portable log cutter 10, according to a preferred embodiment of the present invention; and, FIG. 2 is an environmental view of the opposite side of the portable log cutter 10, according to a preferred embodiment of the present invention; and, FIG. 3 is a side cut-away view of the drive system portion of the portable log cutter 10 in a retracted position, according to a preferred embodiment of the present invention; and, FIG. 4 is a side cut-away view of the drive system portion of the portable log cutter 10 in a deployed position, according to a preferred embodiment of the present invention; and, FIG. 5 is a top view of the drive system portion of the portable log cutter 10, according to a preferred embodiment of the present invention; and, FIG. 6 is a rear perspective view of the portable log cutter 10, according to a preferred embodiment of the present invention; and, FIG. 7 is an electrical block diagram of the portable log cutter 10, according to a preferred embodiment of the present invention.

| | |
|---|---|
| 10 | portable log cutter |
| 15 | first upper guard panel |
| 16 | second upper guard panel |
| 20 | saw blade |
| 21 | log fence |

-continued

| | |
|---|---|
| 22 | feed table |
| 23 | handle |
| 24 | saw shaft frame |
| 25 | blade guard |
| 26 | front guard panel |
| 27 | stop mechanism |
| 28 | side guard panel |
| 29 | rear guard panel |
| 30 | drive pulley |
| 31 | idler pulley |
| 32 | pivot pulley |
| 33 | saw pulley |
| 34 | idler shaft |
| 35 | pivot shaft |
| 36 | saw shaft |
| 37 | shaft collar |
| 38 | collar bushing |
| 39 | first bearing |
| 40 | flange coupling |
| 41 | first bracket |
| 42 | second bracket |
| 42 | second bracket |
| 43 | third bracket |
| 44 | pivot arm |
| 45 | return spring |
| 46 | fasteners |
| 47 | belt |
| 48 | second bearing |
| 49 | rod |
| 50 | trailer frame |
| 51 | upper frame |
| 52 | ball hitch |
| 53 | tongue |
| 54 | tire/wheel assembly |
| 55 | axle assembly |
| 56 | motor frame |
| 57 | blade guard frame |
| 58 | upper guard frame |
| 60 | motor |
| 61 | gas tank |
| 62 | gas cap |
| 63 | gas line |
| 64 | ignition switch |
| 65 | exhaust |
| 66 | battery box |
| 67 | fan |
| 70 | battery |
| 75 | starter/generator |
| 80 | user |
| 81 | log |

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a portable log cutter (herein described as the "apparatus") 10, which provides a means for a portable, vehicle-towed cut-off saw for firewood 81 and the like. The apparatus 10 is transportable behind an automobile, truck, or the like and is powered by an on-board gasoline motor 60 which provides power to a saw blade 20 via a series of belts 47 and pulleys 33. A large retractable circular saw blade 20 pivots and thereby passes across a large stationary feed table 22 by manually pulling a single handle 23 by a user 80. The use of the apparatus 10 allows for the cutting of up to twelve (12") inch diameter logs 81 using a production-type cutting method in a manner which is not only quick, easy and effective, but safer and less fatiguing as well.

Figure 2:
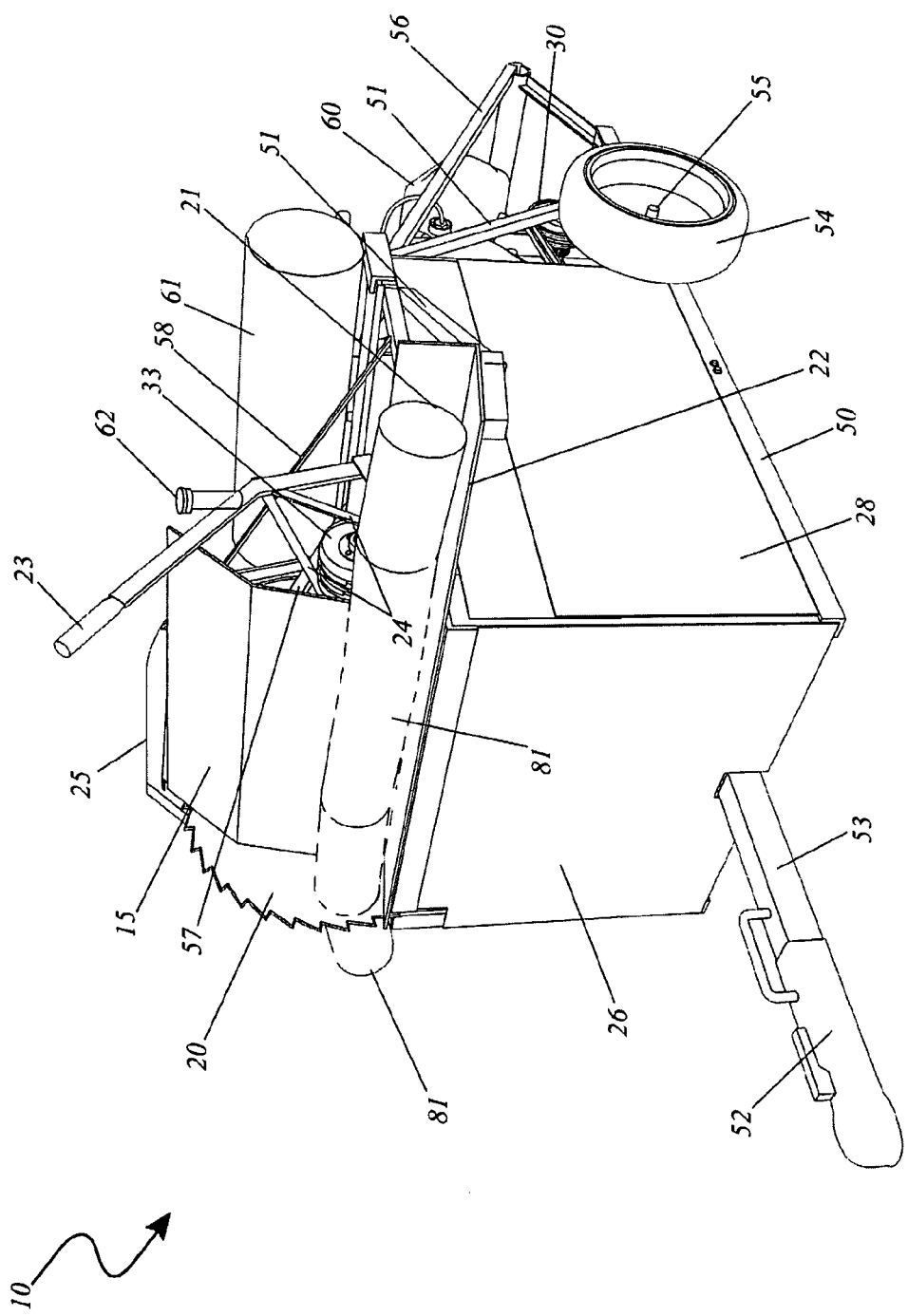

Referring now to FIGS. 1 and 2, environmental views of the apparatus 10, according to the preferred embodiment of the present invention, are disclosed. The apparatus 10 is illustrated here from the left side with cord wood 81 resting on the feed table 22 and the saw blade 20 being moved to a fully extended state by the user 80 pulling the handle 23 forward. The apparatus 10 comprises a trailer frame 50, an upper frame 51, a motor frame 56, a pair of tires 54, an axle assembly 55, a tongue 53, a hitch 52, a saw blade 20, a blade guard 25, a handle 23, a motor assembly 60, a battery box 66, an ignition switch 64, a fence 21, a feed table 22, a first upper guard panel 15, and protective panels mounted to said trailer frame and upper frame 51 to protect the internal components from the environment. The apparatus 10 is envisioned to receive an anti-corrosion finish such as paint being applied to all framing, guarding, and mounting surfaces.

The trailer frame 50 provides a foundation and transportation means to the apparatus 10. The trailer frame 50 provides a base on which a plurality of major sub-systems of the said apparatus 10 are mounted. The trailer frame 50 comprises a dual-wheeled trailer frame 50 with a motor 60 mounting means, and a protective motor frame 26 at the rear, and a towing arm assembly 53 at the front. The trailer frame 50 comprises a generally rectangular frame being parallel to the ground. The trailer frame 50 comprises a sturdy weldment made from materials such as heavy-duty angle iron, round steel tube stock, or the like, thereby providing structural integrity sufficient to support the weight of the apparatus 10. The trailer frame 50 further comprises various heavy mounting plates and brackets as required for the attachment of various sub-systems such as the motor assembly 60 and the saw blade drive system (see FIG. 5). The trailer frame 50 provides an attachment means to particular towing components such as an axle assembly 55, a pair of wheel/tire assemblies 54, a hitch 52, and a tongue 53. It is envisioned that said components are to be attached to the trailer frame 50 using welding or mechanical fasteners 46 such as bolts and nuts. The axle assembly 55 comprises a housing, an axle shaft, wheel bearings, spindles, and a standard circular bolt pattern for attachment of the tire/wheel assemblies 54. The tire/wheel assemblies 54 comprise a pair of high-speed trailer wheels with standard bolt patterns, and multi-ply tires rated for heavy loads. The tongue 53 is envisioned to be made from rectangular structural steel tubing being welded to the trailer frame 50 at a plurality of points thereby providing torsional and linear strength. The tongue 53 provides an attachment means to a ball hitch 52 using fasteners such as bolts, nuts, and the like. The hitch 52 comprises a standard ball type hitch and is to be sized appropriately based upon state and local transportation regulations.

The upper frame 51 comprises similar materials and construction as the trailer frame 50 and provides a supporting and attachment means to a front guard panel 26, a pair of side guard panel 28, a first upper guard panel 15, a blade guard 25, a fence 21, and a feed table 22. The front guard panel 26, the side guard panel 28, and the first upper guard panel 15 comprises a plurality of thin steel sheet metal panels, thereby providing a safety means by limiting access to internal moving parts of the apparatus 10 which are a threat to the user 80 and other people in the vicinity. The saw blade guard 25 is located at the rear of the feed table 22 and provides a safety means to the user 80. The blade guard 25 is envisioned to take the circular shape of the circular saw blade 20 and also provides a narrow opening at the front to allow the leading edge of the saw blade 30 to extend and cut the log 81.

The feed table 22 and the fence 21 provide a support and guiding means to the logs 81 during the cutting process. The feed table 22 comprises a work surface which slopes downward toward the saw blade 20 thereby stabilizing the log against the fence 21. The feed table 22 and the fence 21 comprise a welded assembly of steel plates and is envisioned to be welded at several points to the upper frame 51; however, said feed table 22 and fence 21 may be attached to said frame 51 using fasteners such as bolts, nuts, and the like.

Figure 3:
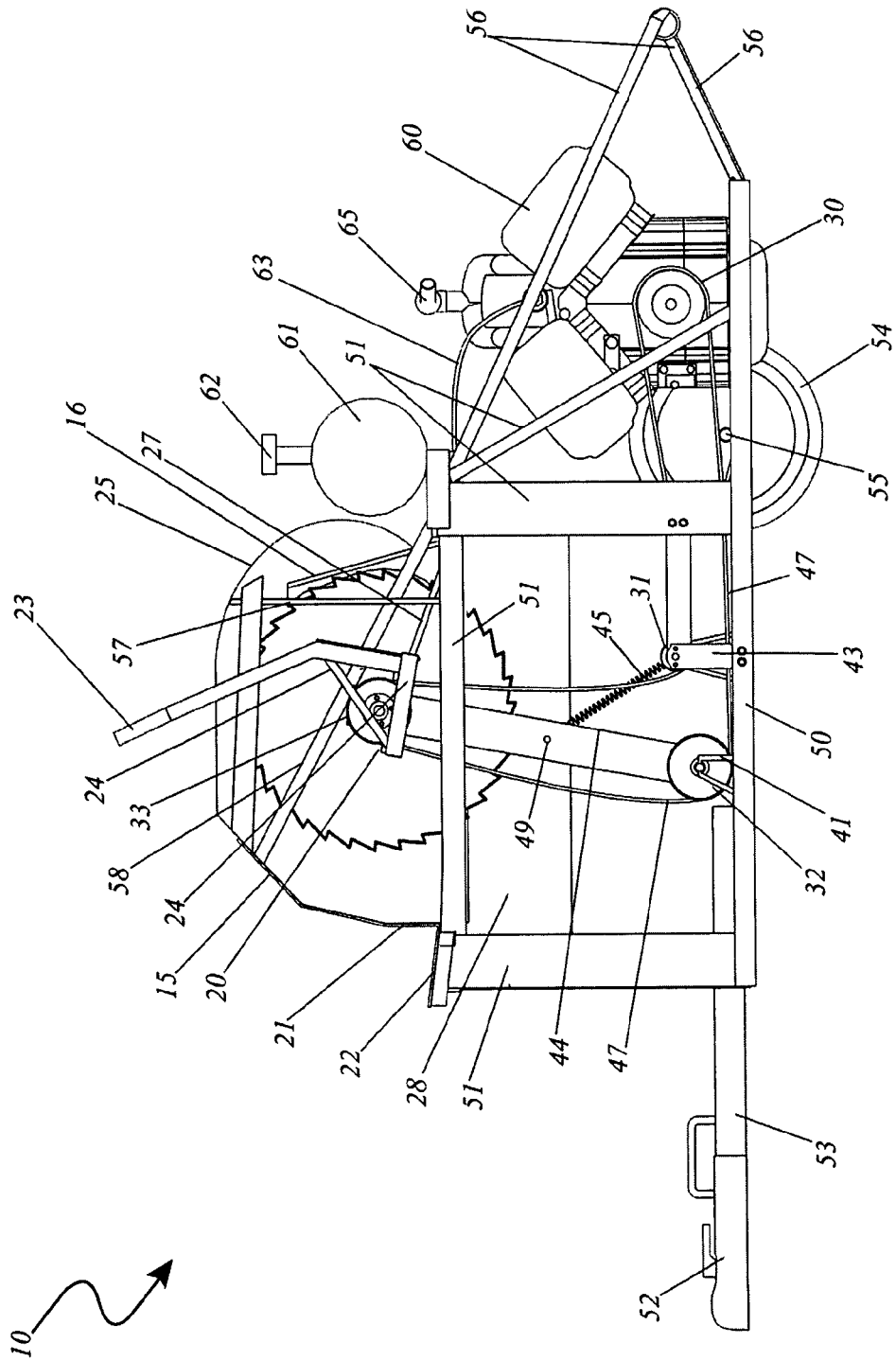

Referring now to FIG. 3, a side cut-away view of the apparatus 10, according to the preferred embodiment of the present invention, is disclosed. The present invention 10 is illustrated here in a guarded position with a special emphasis on the drive system components. The apparatus 10 employs a belt and pulley drive system, thereby enabling continuous transfer of horsepower from the motor 60 to the saw blade 20 as said blade 30 moves through a cutting stroke. The apparatus 10 comprises a trailer frame 50, an upper frame 51, a motor frame 56, a side guard panel 28, a first upper guard panel 15, a second guard panel 16, an upper guard frame 58, a blade guard frame 57, a pair of tire/wheel assemblies 54, an axle assembly 55, a tongue 53, a hitch 52, a saw blade 20, a blade guard 25, a handle 23, a motor assembly 60, a fence 21, a feed table 22, a plurality of guarding panels 26, a drive pulley 30, an idler pulley 31, a third bracket 43, a pivot pulley 32, a saw pulley 33, a pair of belts 47, a pair of pivot arms 44, a saw shaft frame 24, a stop mechanism 27, and a pair of return springs 45.

The drive pulley 30 comprises a standard two (2) groove V-belt pulley and is secured to the motor 60 crank shaft using a common keyway and key and is mounted thereto said crank shaft using methods such as a press-fit, a bolt, or the like. The drive pulley 30 is envisioned to be made of cast iron, machined steel, or the like, all common in the industry. The idler pulley 31, pivot pulley 32, and the saw pulley 33 comprise similar materials and construction as the drive pulley 30 and are provided with appropriate diameters designed to produce the desired revolutions per minute (RPM) to the saw blade 20 being typically in the range of and including 200 to 400 RPMs during operation. The idler pulley 31 provides a means to control the tension on the belt 47 as the saw blade 20 moves through its arching motion. The idler pulley 31 is located in close proximity to the pivot pulley 32, thereby maintaining a constant belt length 47 from the pivot pulley 32 to the saw pulley 33. The idler pulley 31 provides an attachment means to the trailer frame 50 via a third bracket 43. The pivot pulley 32 provides an attachment means to the pivot shaft 32 and the trailer frame 50 via a first bracket 41. The pivot shaft 32 provides an attachment means to the two (2) pivot arms 44 thereby acting as a fulcrum.

The pivot arm 44 comprises a generally vertical pair of pivoting steel plates providing an arcing motion to the saw blade 20, the saw pulley 33, and the saw shaft frame 24. The pivot arms 44 enable said blade 20 to reciprocate from said guarded position, furthest from the feed table 22, to said cutting position (see FIG. 4) during operation. The stop mechanism 27 provides a hard stop position for the saw blade 20 by making contact with the saw shaft frame 24 when the saw blade 20 is retracted or the user 80 releases the handle 23. The stop mechanism 27 is stationarily attached to the upper frame 51 using such methods as welding, bolts, or the like. The return springs 45 provide a tension force to the pivot arms 44, thereby pulling the saw blade 30 toward the guarded position and against the stop mechanism 27 for safety purposes. The return springs 45 are envisioned to be heavy-duty steel tension springs common in the industry.

The saw blade 20 comprises a large-toothed buzz saw blade of approximately twenty (20) to thirty (30) inches in diameter common in the industry. The belts 47 comprise a continuous heat-welded V-belt material with impregnated cords common in the industry. The saw shaft frame 24 provides an attachment and supporting means from the pivot arms 44 to the handle 23. The handle 23 comprises an ergonomic grip 32 on its distal end for manually pivoting the pivot arms 44 and the saw blade 20. See FIG. 5 for a more detailed discussion of the drive system.

Figure 4:
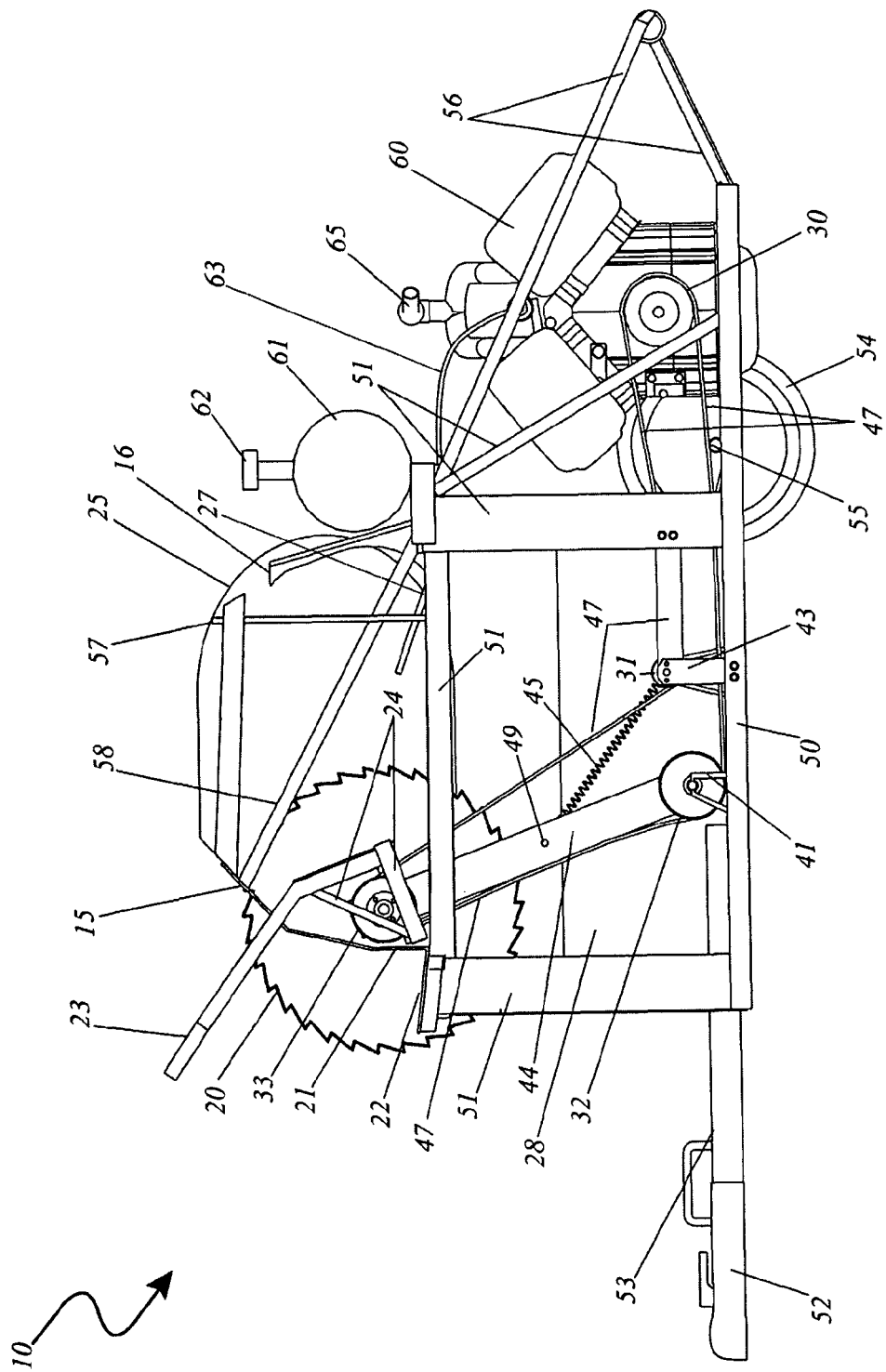

Referring now to FIG. 4, a side cut-away view of the apparatus 10, according to the preferred embodiment of the present invention, is disclosed. The apparatus 10 is illustrated here in said cutting position with the saw blade 20, the pivot arms 44, the return springs 45, and the handle 23 in said cutting position.

Figure 5:
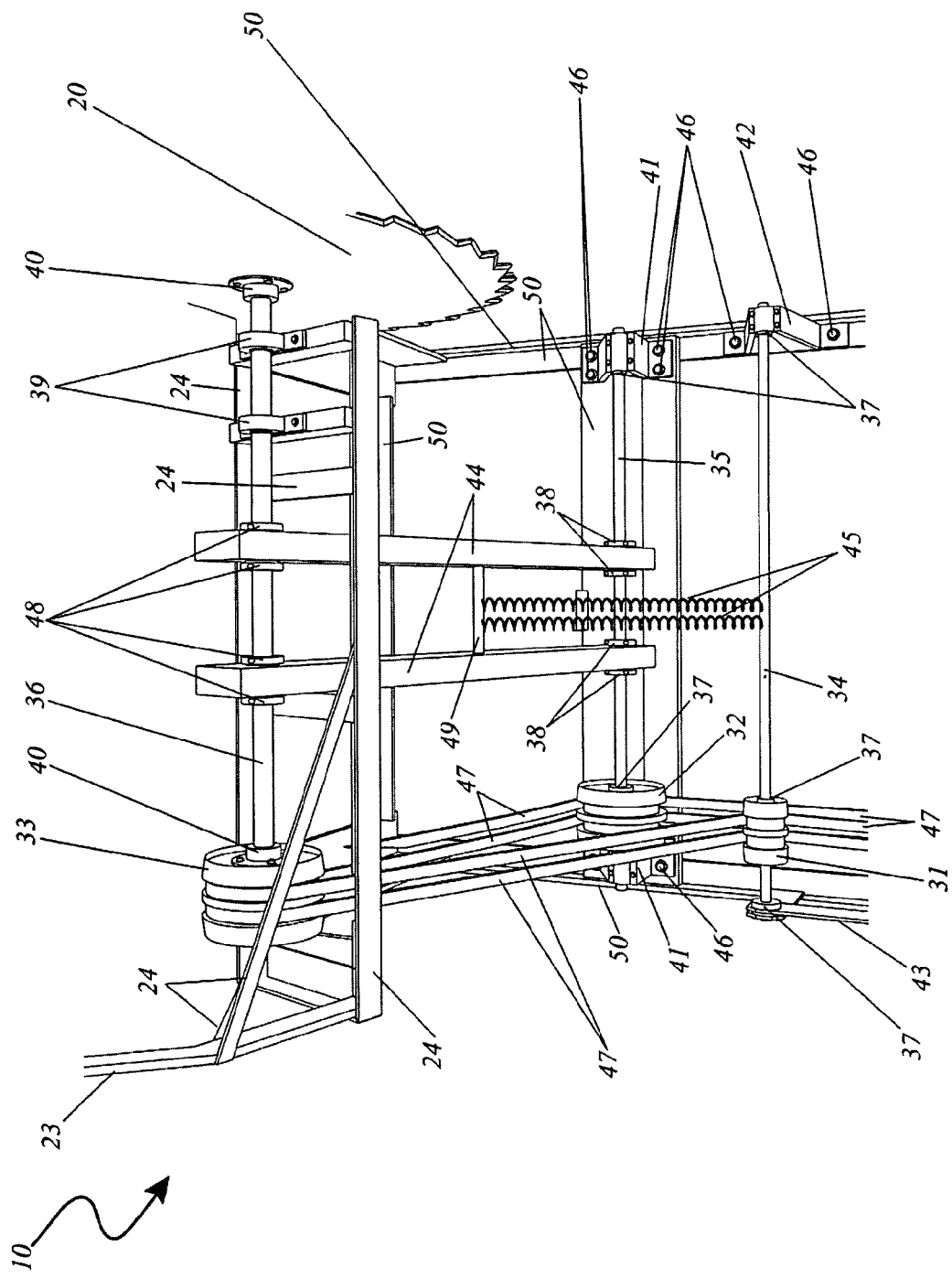

Referring now to FIG. 5, a top view of the drive system portion of the apparatus 10, according to the preferred embodiment of the present invention, is disclosed. The apparatus 10 is illustrated here showing the three (3) major drive shaft assemblies. The apparatus 10 comprises an idler pulley 31 and idler shaft 34 assembly; a pivot pulley 32 and pivot shaft 35 assembly; and a saw pulley 33 and saw shaft 36 assembly. The three (3) shafts 34, 35, 36 are envisioned to be solid steel shafts approximately one (1") inch in diameter common in the industry using standard machining processes.

The idler shaft assembly 34 further comprises a stationary fixed shaft 34, an idler pulley 31, a plurality of shaft collars 37, a second bracket 42, and a third bracket 43. The brackets 42, 43 provide a radial clamping means at each end of said idler shaft 34. The idler pulley 31 comprises a standard two (2) groove V-belt pulley with integral ball bearings. The shaft collars 37 are located adjacent to said brackets 42, 43 and provide a lateral clamping means thereby securing the idler shaft 34 in the horizontal axis. The shaft collars 37 are envisioned to be a one (1) or two (2) piece type shaft collar common in the industry. The second bracket 42 and third bracket 43 are envisioned to provide an attachment means to the trailer frame 50 using fasteners 46; however, said brackets 42, 43 may be attached using welding, rivets, or the like.

The pivot shaft assembly 35 further comprises a stationary fixed shaft 34, a pivot pulley 32, a plurality of shaft collars 37, a pair of pivot arms 44, and a pair of first brackets 41. The brackets 41 provide a radial clamping means at each end of said shaft 35. The pivot pulley 32 comprises a standard two (2) groove V-belt pulley with integral ball bearings. The shaft collars 37 are located adjacent to said first brackets 41 and provide a lateral clamping means, thereby securing the idler shaft 34 in the horizontal axis. The pivot shaft 35 provides an attachment means to the pivot arms 44 via four (4) shaft collars 37 being located and mounted thereto at an intermediate position along said pivot shaft 35. The shaft collars 37 are envisioned to be a one (1) or two (2) piece type collar common in the industry. The first brackets 41 are envisioned to provide an attachment means to the trailer frame 50 using fasteners 46; however, may be provided using welding, rivets, or the like.

The saw shaft assembly 36 further comprises a rotating shaft 36, a saw pulley 33, a plurality of shaft collars 37, a pair of first bearings 39, a pair of second bearings 48, and a pair of flange couplings 40. The saw pulley 33 comprises a standard two (2) groove V-belt pulley providing an attachment means to the said shaft 36 using a pair of locking flange couplings 40. The flange couplings 40 comprise of a common bolt pattern being affixed to the opposing faces of the saw pulley 33 using bolts. The flange couplings 40 further provide an attachment means to the saw shaft 36 using a keyway and key common in the industry. The second bearings 48 are press-fit to the saw shaft 36 thereby providing a horizontal positioning means to said saw shaft 36. The pivot arms 44 provide a mounting means via a slip-fit bored hole to receive the second bearings 48. The second bearings 48 comprise standard ball bearings common in the industry. The second bearings 48 further comprise retaining plates (not shown) thereby providing a fixed lateral position control to the pair of pivot arms 44. The first bearings 39 are envisioned to be standard pillow block style ball bearings thereby providing an alignment means to the saw shaft 36. The first bearings 39, along with the pivot arms 44, provide a torsion means and support system to the saw shaft 36. The pivot arms 44 also provide an attachment means to the return springs 45 via a horizontal rod 49 which is located in a generally intermediate position along and between the pivot arms 44.

Figure 6:
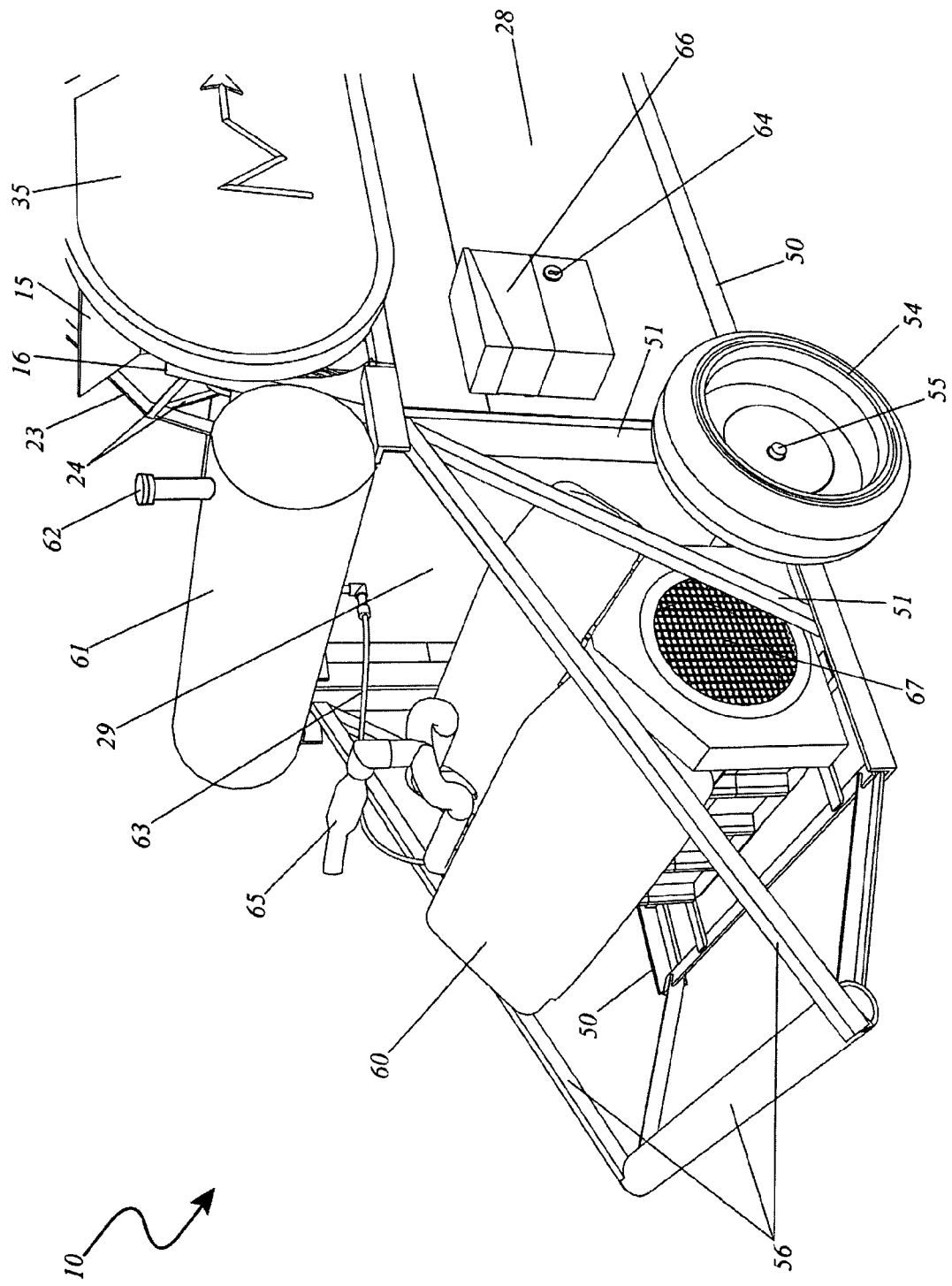

Referring now to FIG. 6, a rear perspective view of the drive system portion of the apparatus 10, according to the preferred embodiment of the present invention, is disclosed. Specifically illustrated here are the power and controls portion of the apparatus 10 which comprises an on-board motor 60, a motor frame 56, a rear guard panel 29, a cooling fan 67, a muffler 65, a gas tank 61, a fill tube 62, a gas line 63, a battery box 66, and an ignition switch 64.

The motor 60 is mounted to the trailer frame 50 using fasteners such as bolts, nuts, and the like. The motor 60 is protected by a motor frame 56 which comprises a weldment around the motor 60 and is made using materials similar to those of the trailer frame 50. The motor 60 is envisioned to be a commercially available air-cooled four (4) cylinder gasoline motor common in the industry; however, a variety of motors which produce sufficient horsepower may be provided and as such should not be interpreted as a limiting factor of the present invention 10. The motor 60 also comprises a sound muffler 65 and a fuel delivery system which further comprises a gas tank 61 having a capacity of approximately ten (10) to thirty (30) gallons. The fill tube 62 provides a filling means to the gas tank 61 and is envisioned to be a standard top-mounted fill tube 62 with a screw cap. A standard gas line 63 is provided to deliver gasoline from the gas tank 61 to the motor intake system 60. The gas line 63 is envisioned to be made from standard thin-wall tubing using materials such as copper, stainless steel, or the like and is further envisioned to be provided with all necessary fittings.

The battery box 66 provides a housing and protection means for a standard 12-volt battery therein to supply electrical power to the motor 60. The battery box 66 is envisioned to be located adjacent to the motor 60 being attached to the side guard panel 28 using fasteners such as bolts, screws, welding, or the like. The ignition switch 64 comprises a key-operated switch similar to those used in the automotive industry and is envisioned to perform normal functions such as starting the motor, providing current to the ignition system, and securing the apparatus 10 against unauthorized use.

Figure 7:
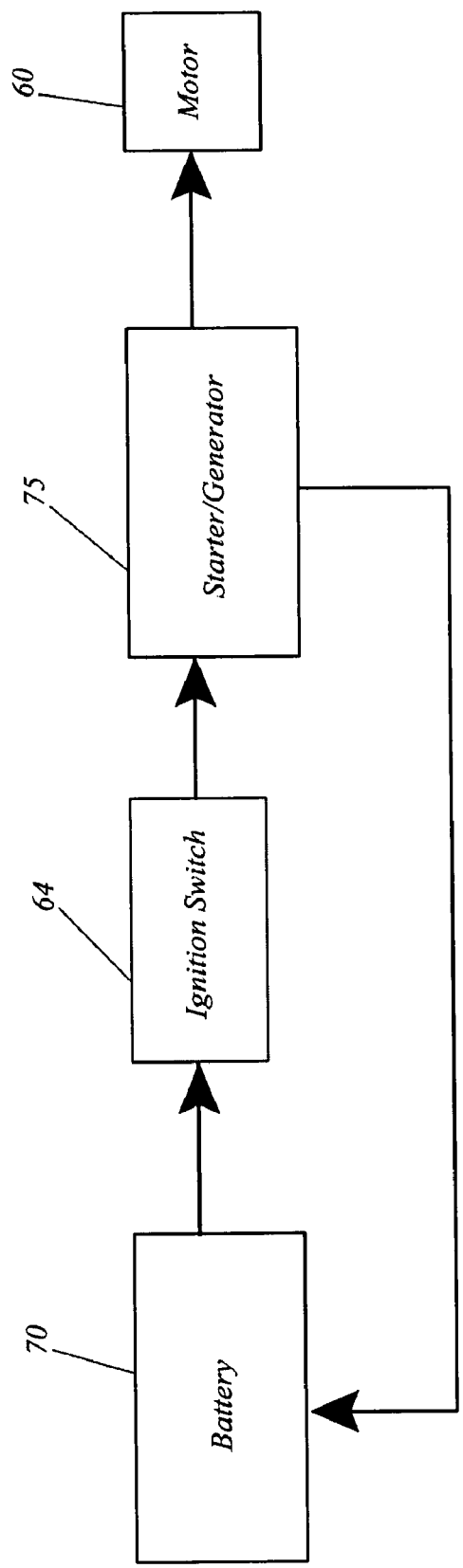

Referring now to FIG. 7, an electrical block diagram of the apparatus 10, according to the preferred embodiment of the present invention, is disclosed. The apparatus 10 comprises a 12-volt electrical system similar to those used on common garden tractors and is common in the industry. Electrical power is provided by a standard 12-volt automotive battery 70 as current is directed through an ignition switch 64 to a starter/generator unit 75. The starter/generator unit 75 provides torque to the motor 60 thereby beginning the starting cycle. When the motor 60 is running normally the starter/generator unit 75 provides a charging voltage to the battery 70.

It is envisioned that other styles and configurations of the present invention can be easily incorporated into the teachings of the present invention, and only one particular configuration shall be shown and described for purposes of clarity and disclosure and not by way of limitation of scope. The preferred embodiment of the present invention can be utilized by the common user, who has little or no training, in a simple and effortless manner. After initial purchase or acquisition of the apparatus 10, it would be installed as indicated in FIG. 1.

The method of installing and utilizing the apparatus 10 may be achieved by performing the following steps: hitching the apparatus 10 to a tractor or truck using the hitch 52; towing and parking said apparatus 10 on level ground in close proximity to the supply of wood 81 to be cut; filling the gas tank 61; taking all appropriate safety precautions before starting the apparatus 10 such as wearing safety glasses and other appropriate safety clothing; cleaning all wood particles from around the motor 60, the drive system, and the feed table area 22; starting the apparatus 10 using the ignition switch 64 to start the motor 60; positioning a log 81 onto the right side of the feed table 22 and securing it against the fence 21; sliding the log 81 horizontally to the left along the feed table 22 and into line with the saw blade 20 such that a desired cut length is achieved; giving proper care to safety by keeping hands and all other objects away from the saw blade 20 path; grasping and pulling the handle 23 slowly forward thereby pivoting the rotating saw blade 20 forward; cutting through the log 81; pushing the handle 23 back such that said saw blade frame 24 rests against said stop mechanism 27 and said saw blade 20 abuts said second upper guard panel 16; releasing said handle 23; accumulating a pile of cut logs 81 to the left side of the operator 80; halting the apparatus 10 by switching off the ignition 64; and, benefiting from the increased productivity resulting from having used the apparatus 10 to cut logs 81.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A vehicle-towed log cutter comprising:
    a trailer frame having a rear portion comprising an axle assembly and a pair of tires connected to said axle assembly, and a hitch and a tongue positioned at a front portion of said trailer frame;
    an upper frame connected to said trailer frame, further comprising a rectangular shaped frame disposed above said trailer frame;
    a motor mounted to said trailer frame aft of said upper frame;
    a motor frame connected to said trailer and upper frames aft of said upper frame and disposed above said trailer frame and motor for protecting said motor;
    a drive pulley secured to said motor;
    a pivot pulley secured to said trailer frame via a pair of first brackets of a pivot shaft assembly;
    an idler pulley secured to said trailer frame via a second bracket and to said trailer frame and said upper frame via a third bracket of an idler shaft assembly;
    a saw pulley;
    a belt operably engaged with said drive, idler, pivot, and saw pulleys respectively;
    a saw blade located adjacent to said trailer frame and being powered by said motor;
    a handle biasing said saw blade along an arching motion;
    a front guard panel extending downwardly from a front portion of said upper frame and connected to said trailer frame;
    a pair of side guard panels extending downwardly from opposing side portions of said upper frame;
    a fence connected to a top surface of said front portion of said upper frame and extending upwardly therefrom;
    a feed table connected to and spanning an entire width of a front portion of said fence;
    a first upper guard panel connected to said fence and extending upwardly therefrom; and,
    a saw blade guard positioned at said upper frame;
    wherein said motor is mounted to said motor frame with a motor mounting mechanism;
    wherein said saw blade guard is located at a rear of said feed table such that a leading edge of said saw blade extends beyond said saw blade guard for cutting a log;
    wherein said feed table slopes downward toward said saw blade and is thereby adapted to stabilize said log against said fence;
    wherein said idler pulley controls a tension on said belt as said saw blade is moved through an arching motion; and,
    wherein said idler pulley is located in close proximity to said pivot pulley such that said belt maintains a constant length from said pivot pulley to said saw pulley.

2. The vehicle-towed log cutter of claim 1, further comprising:
    a saw shaft frame connected to said handle;
    a pair of pivot arms moving said saw blade, said saw pulley, and said saw shaft frame along said arching motion, said pivot arms causing said saw blade to reciprocate from a guarded position to a cutting position, said guarded position being defined when said saw blade is furthest from said feed table;
    a stop mechanism providing a hard stop position for said saw blade by contacting said saw shaft frame upon releasing said handle;
    wherein said stop mechanism is stationarily attached to said upper frame; and,
    a plurality of return springs providing a tension force to said pivot arms and thereby pulling said saw blade toward said guarded position and against said stop mechanism.

3. The vehicle-towed log cutter of claim 2, further comprising: an idler shaft assembly comprising:
    a stationary fixed idler shaft; and,
    a plurality of shaft collars;
    wherein said second and third brackets are clamped at each end of said idler shaft;

wherein said idler pulley includes a two-groove V-belt pulley;

wherein said shaft collars are located adjacent to said brackets and are secured to said idler shaft along a horizontal axis; and, wherein said second bracket and third bracket are further attached to said trailer frame.

4. The vehicle-towed log cutter of claim 3, further comprising:

a pivot shaft assembly including a pivot shaft;

wherein said first bracket is clamped to said pivot shaft;

wherein said pivot pulley is a two-groove V-belt pulley;

wherein said shaft collars are located adjacent to said first bracket and are secured to said idler shaft in the horizontal axis;

wherein pivot shaft is attached to said pivot arms via said shaft collars mounted at an intermediate position along said pivot shaft; and, wherein said pivot shaft acts as a fulcrum to said pivot arm.

5. The vehicle-towed log cutter of claim 4, further comprising: a saw shaft assembly comprising a rotating shaft;

a saw pulley;

a plurality of first bearings;

a plurality of second bearings;

a plurality of flange couplings; and a horizontal rod intermediately located between said pivot arms;

wherein said saw pulley is a two-groove V-belt pulley attached to said rotating shaft via said flange couplings;

wherein said flange couplings are affixed to opposing faces of said saw pulley;

wherein said second bearings are press-fitted to said saw shaft and thereby horizontally position said saw shaft;

wherein said pivot arms at attached to said second bearings;

wherein said first bearings and said pivot arms provide torque to said saw shaft; and, wherein said pivot arms are attached to said return springs via said horizontal rod.

6. A vehicle-towed log cutter comprising:

a trailer frame having a rear portion comprising an axle assembly and a pair of tires connected to said axle assembly, and a hitch and a tongue positioned at a front portion of said trailer frame;

an upper frame connected to said trailer frame, further comprising a rectangular shaped frame disposed above said trailer frame;

a motor mounted to said trailer frame aft of said upper frame;

a motor frame connected to said trailer and upper frames aft of said upper frame and disposed above said trailer frame and motor for protecting said motor;

a drive pulley secured to said motor;

a pivot pulley secured to said trailer frame via a pair of first brackets of a pivot shaft assembly;

an idler pulley secured to said trailer frame via a second bracket and to said trailer frame and said upper frame via a third bracket of an idler shaft assembly;

a saw pulley;

a belt operably engaged with said drive, idler, pivot, and saw pulleys respectively;

a saw blade located adjacent to said trailer frame and being powered by said motor;

a handle biasing said saw blade along an arching motion;

a battery box adapted to house a battery therein to supply electrical power to said motor;

a front guard panel extending downwardly from a front portion of said upper frame and connected to said trailer frame;

a pair of side guard panels extending downwardly from opposing side portions of said upper frame;

a fence connected to a top surface of said front portion of said upper frame and extending upwardly therefrom;

a feed table connected to and spanning an entire width of a front portion of said fence;

a first upper guard panel connected to said fence and extending upwardly therefrom; and, a saw blade guard positioned at said upper frame;

wherein said motor is mounted to said motor frame with a motor mounting mechanism;

wherein said saw blade guard is located at a rear of said feed table such that a leading edge of said saw blade extends beyond said saw blade guard for cutting a log;

wherein said feed table slopes downward toward said saw blade and is thereby adapted to stabilize the log against said fence;

wherein said idler pulley controls a tension on said belt as said saw blade is moved through an arching motion; and, wherein said idler pulley is located in close proximity to said pivot pulley such that said belt maintains a constant length from said pivot pulley to said saw pulley.

7. The vehicle-towed log cutter of claim 6, further comprising:

a saw shaft frame connected to said handle;

a pair of pivot arms moving said saw blade, said saw pulley, and said saw shaft frame along said arching motion, said pivot arms causing said saw blade to reciprocate from a guarded position to a cutting position, said guarded position being defined when said saw blade is furthest from said feed table;

a stop mechanism providing a hard stop position for said saw blade by contacting said saw shaft frame upon releasing said handle;

wherein said stop mechanism is stationarily attached to said upper frame; and, a plurality of return springs providing a tension force to said pivot arms and thereby pulling said saw blade toward said guarded position and against said stop mechanism.

8. The vehicle-towed log cutter of claim 7, further comprising: an idler shaft assembly comprising:

a stationary fixed idler shaft; and, a plurality of shaft collars;

wherein said second and third brackets are clamped at each end of said idler shaft;

wherein said idler pulley includes a two-groove V-belt pulley;

wherein said shaft collars are located adjacent to said brackets and are secured to said idler shaft along a horizontal axis; and, wherein said second bracket and third bracket are further attached to said trailer frame.

9. The vehicle-towed log cutter of claim 8, further comprising:

a pivot shaft assembly including a pivot shaft;

wherein said first bracket is clamped to said pivot shaft;

wherein said pivot pulley is a two-groove V-belt pulley;

wherein said shaft collars are located adjacent to said first bracket and are secured to said idler shaft in the horizontal axis;

wherein pivot shaft is attached to said pivot arms via said shaft collars mounted at an intermediate position along said pivot shaft; and, wherein said pivot shaft acts as a fulcrum to said pivot arm.

10. The vehicle-towed log cutter of claim 9, further comprising: a saw shaft assembly comprising:
- a rotating shaft;
- a saw pulley;
- a plurality of first bearings;
- a plurality of second bearings;
- a plurality of flange couplings; and,
- a horizontal rod intermediately located between said pivot arms;
- wherein said saw pulley is a two-groove V-belt pulley attached to said rotating shaft via said flange couplings;
- wherein said flange couplings are affixed to opposing faces of said saw pulley;
- wherein said second bearings are press-fitted to said saw shaft and thereby horizontally position said saw shaft;
- wherein said pivot arms at attached to said second bearings;
- wherein said first bearings and said pivot arms provide torque to said saw shaft; and,
- wherein said pivot arms are attached to said return springs via said horizontal rod.

* * * * *